United States Patent
Mohamadi et al.

(10) Patent No.: US 8,779,966 B2
(45) Date of Patent: Jul. 15, 2014

(54) REMOTE INTERROGATION FOR DETECTION OF ACTIVITY OR LIVING ORGANISMS INSIDE ELECTRONICALLY CONDUCTIVE CONTAINERS

(75) Inventors: Farrokh Mohamadi, Irvine, CA (US); Mikko Oijala, Orange, CA (US); Paul Strauch, Newport Beach, CA (US)

(73) Assignee: Tialinx, Inc., Irvine, CA (US)

( * ) Notice: Subject to any disclaimer, the term of this patent is extended or adjusted under 35 U.S.C. 154(b) by 292 days.

(21) Appl. No.: 13/298,209

(22) Filed: Nov. 16, 2011

(65) Prior Publication Data

US 2012/0119935 A1    May 17, 2012

Related U.S. Application Data

(60) Provisional application No. 61/414,305, filed on Nov. 16, 2010.

(51) Int. Cl.
  *G01S 13/00* (2006.01)
  *G01S 13/74* (2006.01)

(52) U.S. Cl.
  USPC .................. 342/22; 342/27; 342/28; 342/42; 342/175

(58) Field of Classification Search
  USPC ........................................ 342/22, 42–51, 175
  See application file for complete search history.

(56) References Cited

U.S. PATENT DOCUMENTS

| | | | | |
|---|---|---|---|---|
| 3,772,668 A * | 11/1973 | Smith | ............................. | 340/8.1 |
| 4,016,529 A * | 4/1977 | Inuzuka et al. | ................. | 367/93 |
| 4,688,244 A * | 8/1987 | Hannon et al. | ............ | 340/426.28 |
| 4,750,197 A * | 6/1988 | Denekamp et al. | ......... | 455/404.2 |
| 5,361,070 A * | 11/1994 | McEwan | ......................... | 342/21 |
| 5,448,220 A * | 9/1995 | Levy | ......................... | 340/539.26 |
| 5,448,501 A * | 9/1995 | Hablov et al. | ............... | 340/573.1 |
| 5,507,291 A * | 4/1996 | Stirbl et al. | .................... | 600/407 |
| 5,573,012 A * | 11/1996 | McEwan | ....................... | 600/595 |
| 5,894,266 A * | 4/1999 | Wood et al. | .............. | 340/539.17 |
| 6,239,736 B1 * | 5/2001 | McDonald et al. | .............. | 342/28 |
| 6,281,794 B1 * | 8/2001 | Duan et al. | .................. | 340/572.1 |
| 6,359,582 B1 * | 3/2002 | MacAleese et al. | ............ | 342/22 |
| 6,437,702 B1 * | 8/2002 | Ragland et al. | ............ | 340/686.1 |
| 6,687,609 B2 * | 2/2004 | Hsiao et al. | .................... | 701/517 |
| 6,870,476 B2 * | 3/2005 | Cockburn et al. | ............. | 340/541 |
| 6,894,636 B2 * | 5/2005 | Anderton et al. | ............... | 342/22 |
| 6,963,307 B2 * | 11/2005 | Mohamadi | ............. | 343/700 MS |
| 7,001,334 B2 * | 2/2006 | Reed et al. | .................... | 600/300 |
| 7,019,683 B2 * | 3/2006 | Stevens et al. | ................... | 342/28 |
| 7,106,244 B2 * | 9/2006 | Hsu | ................................. | 342/27 |
| 7,126,542 B2 * | 10/2006 | Mohamadi | ............. | 343/700 MS |
| 7,224,308 B2 * | 5/2007 | Butler et al. | .................... | 342/45 |

(Continued)

*Primary Examiner* — Peter Bythrow
(74) *Attorney, Agent, or Firm* — Haynes and Boone, LLP

(57) ABSTRACT

A system includes: a radar scanner disposed to scan the interior of a container; an interrogator in communication with the scanner; and a processing system in communication with the interrogator, in which the processing system displays information about the interior of the container. A method includes: mounting a radar scanner antenna to a container so as to scan the interior of the container; connecting a coupler to the scanner so that the scanner communicates scanning data via the coupler to the exterior of the container. Another method includes: coupling an interrogator and radar processing system to a scanner mounted on a container; and processing radar scan data from the interior of the container. Another method includes: linking a radar processing system via a communications link to an interrogator that is coupled to a scanner mounted on a container; and processing radar scan data from the interior of the container.

19 Claims, 8 Drawing Sheets

(56) References Cited

U.S. PATENT DOCUMENTS

| | | | |
|---|---|---|---|
| 7,286,040 B2* | 10/2007 | Karabinis | 340/10.1 |
| 7,319,401 B2* | 1/2008 | Åkerstrom et al. | 340/612 |
| 7,339,469 B2* | 3/2008 | Braun | 340/539.13 |
| 7,358,848 B2* | 4/2008 | Mohamadi | 340/10.34 |
| 7,414,571 B2* | 8/2008 | Schantz et al. | 342/125 |
| 7,432,855 B2* | 10/2008 | Mohamadi | 342/368 |
| 7,501,944 B2* | 3/2009 | Hyde | 340/539.13 |
| 7,518,542 B1* | 4/2009 | Steinway et al. | 342/22 |
| 7,567,200 B1* | 7/2009 | Osterweil | 342/28 |
| 7,609,159 B2* | 10/2009 | Benson et al. | 340/540 |
| 7,692,585 B2* | 4/2010 | Mohamadi | 342/368 |
| 7,697,958 B2* | 4/2010 | Mohamadi | 455/562.1 |
| 7,742,000 B2* | 6/2010 | Mohamadi | 343/700 MS |
| 7,825,803 B2* | 11/2010 | Neff et al. | 340/572.1 |
| 7,889,113 B2* | 2/2011 | Cardiasmenos et al. | 342/22 |
| 8,482,399 B2* | 7/2013 | Breed | 340/500 |
| 2003/0160701 A1* | 8/2003 | Nakamura et al. | 340/686.6 |
| 2003/0189510 A1* | 10/2003 | Anderton et al. | 342/22 |
| 2003/0227382 A1* | 12/2003 | Breed | 340/539.13 |
| 2004/0032363 A1* | 2/2004 | Schantz et al. | 342/127 |
| 2004/0100379 A1* | 5/2004 | Boman et al. | 340/539.26 |
| 2004/0233054 A1* | 11/2004 | Neff et al. | 340/539.1 |
| 2004/0249258 A1* | 12/2004 | Tupin et al. | 600/407 |
| 2005/0046567 A1* | 3/2005 | Mortenson et al. | 340/539.13 |
| 2005/0190097 A1* | 9/2005 | Hsu | 342/22 |
| 2005/0195101 A1* | 9/2005 | Stevens et al. | 342/28 |
| 2006/0109106 A1* | 5/2006 | Braun | 340/539.13 |
| 2006/0192709 A1* | 8/2006 | Schantz et al. | 342/125 |
| 2007/0085677 A1* | 4/2007 | Neff et al. | 340/539.22 |
| 2007/0197881 A1* | 8/2007 | Wolf et al. | 600/300 |
| 2007/0285240 A1* | 12/2007 | Sensenig et al. | 340/572.1 |
| 2008/0074307 A1* | 3/2008 | Boric-Lubecke et al. | 342/28 |
| 2008/0143593 A1* | 6/2008 | Graziano et al. | 342/357.09 |
| 2009/0058711 A1* | 3/2009 | Dixon et al. | 342/28 |
| 2009/0102660 A1* | 4/2009 | Evans et al. | 340/572.1 |
| 2009/0140908 A1* | 6/2009 | Daly et al. | 342/22 |
| 2010/0130873 A1* | 5/2010 | Yuen et al. | 600/484 |
| 2010/0141502 A1* | 6/2010 | Cardiasmenos et al. | 342/22 |
| 2010/0204550 A1* | 8/2010 | Heneghan et al. | 600/301 |
| 2010/0204587 A1* | 8/2010 | Lin et al. | 600/484 |
| 2010/0265068 A1* | 10/2010 | Brackmann et al. | 340/572.1 |
| 2010/0292568 A1* | 11/2010 | Droitcour et al. | 600/425 |
| 2011/0037591 A1* | 2/2011 | Easley et al. | 340/539.13 |
| 2011/0040176 A1* | 2/2011 | Razansky et al. | 600/425 |
| 2011/0095940 A1* | 4/2011 | Breed | 342/146 |

* cited by examiner

Example of two ways the radar can detect movement/breathing of a person/animal in a non-line of site situation within the container:

1. Multipath 1st, 2nd and 3rd order reflections due to metal (conductive) walls
2. Penetration capability of UWB radar, for example, through wood

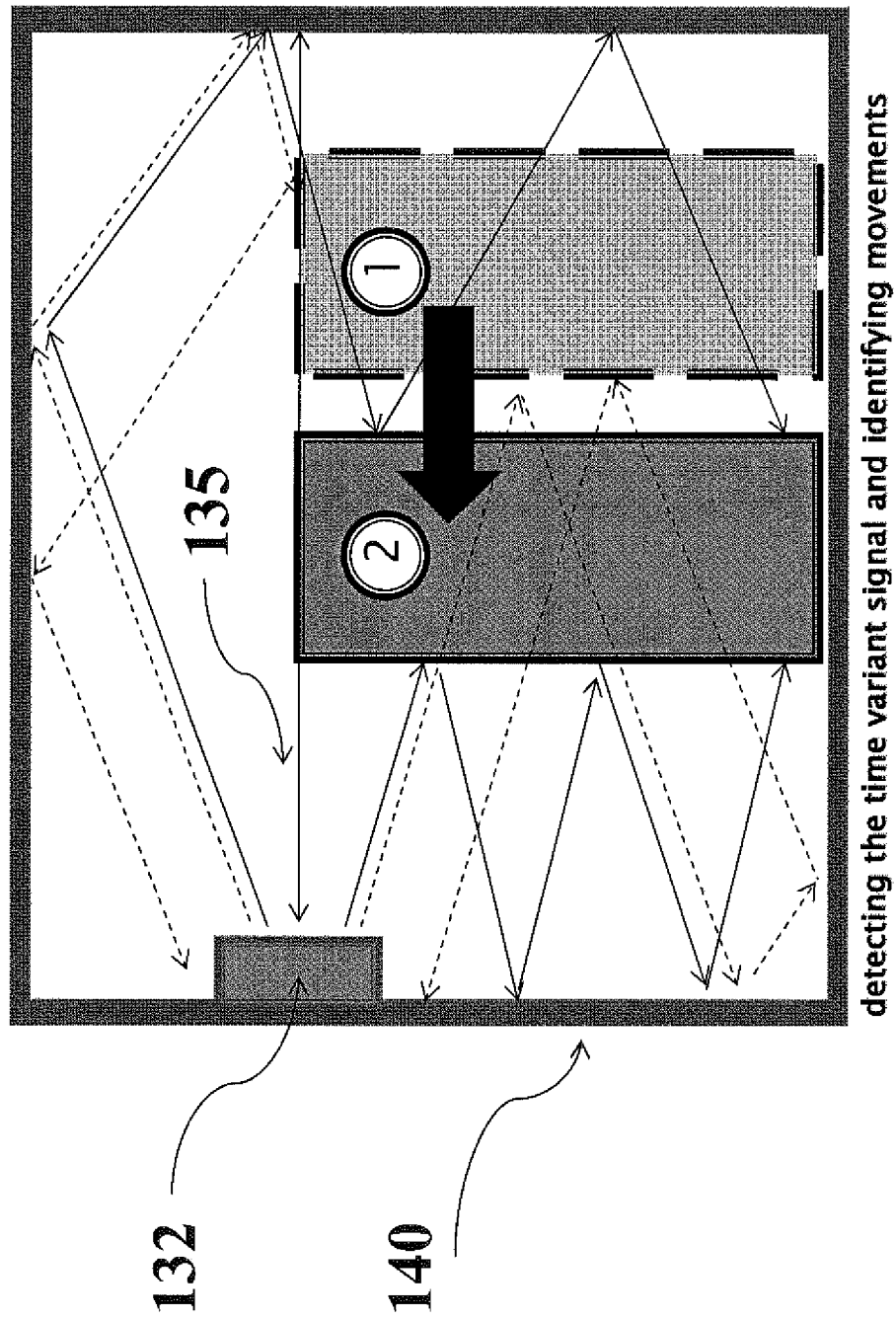

US 8,779,966 B2

REMOTE INTERROGATION FOR DETECTION OF ACTIVITY OR LIVING ORGANISMS INSIDE ELECTRONICALLY CONDUCTIVE CONTAINERS

CROSS REFERENCE TO RELATED APPLICATIONS

This application claims the benefit of U.S. Provisional Application No. 61/414,305, filed Nov. 16, 2010, which is incorporated by reference.

BACKGROUND

The present disclosure generally relates to radio frequency (RF) detection and ranging (RADAR) and, more particularly, to providing surveillance information about interior spaces where radar is ordinarily not applicable such as the interior of metal cargo containers.

Portable, hand-held radars have been used for detection of hidden objects, e.g., objects such as weapons hidden behind a wall of a building. Some portable, hand-held radar units are capable of discriminating living individuals from inanimate objects and detecting whether an individual may be carrying an object of interest such as a concealed weapon or an improvised explosive device (IED). Such technology may be useful in situations where surveillance of an inhabitable area from behind a surface—such as a building wall, block wall, construction fence screen, boundary fence, or other non-electrically shielded obstruction—may be desired. Some examples include detecting illegal activities such as smuggling or illegal border crossings or, for example, detecting the presence of hostile individuals in a war zone or terrorist situation. In some situations, e.g., police work, military combat scenarios, fire and rescue situations, or border and immigration control, it may be desirable to be able to detect living individuals, and various objects that may be in their possession using a portable, hand-held or other widely deployable radar system from outside any kind of structure occupied by the individuals, for example, a building, temporary shelter, or vehicle. Such portable, hand-held radars may not be applicable, however, for interior spaces that are electrically shielded from a radar unit at the exterior, such as a metal shipping container, metal semi-trailer rig, or metal or carbon fiber aircraft fuselage, for example.

SUMMARY

According to one embodiment, a system includes: a radar scanner disposed to scan the interior of a container; an interrogator in communication with the scanner; and a processing system in communication with the interrogator, in which the processing system displays information about the interior of the container.

According to another embodiment, a method includes: mounting a radar scanner antenna to a container so as to scan the interior of the container; connecting a coupler to the scanner so that the scanner communicates scanning data via the coupler to the exterior of the container.

According to another embodiment, a method includes: coupling an interrogator and radar processing system to a scanner mounted on a container; and processing radar scan data from the interior of the container.

According to another embodiment, a method includes: linking a radar processing system via a communications link to an interrogator that is coupled to a scanner mounted on a container; and processing radar scan data from the interior of the container.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 7 is a schematic diagram showing an example of radar detection of movement inside a container, in accordance with an embodiment.

Embodiments and their advantages are best understood by referring to the detailed description that follows. Like reference numerals are used to identify like elements illustrated in one or more of the figures.

DETAILED DESCRIPTION

Figure 1:
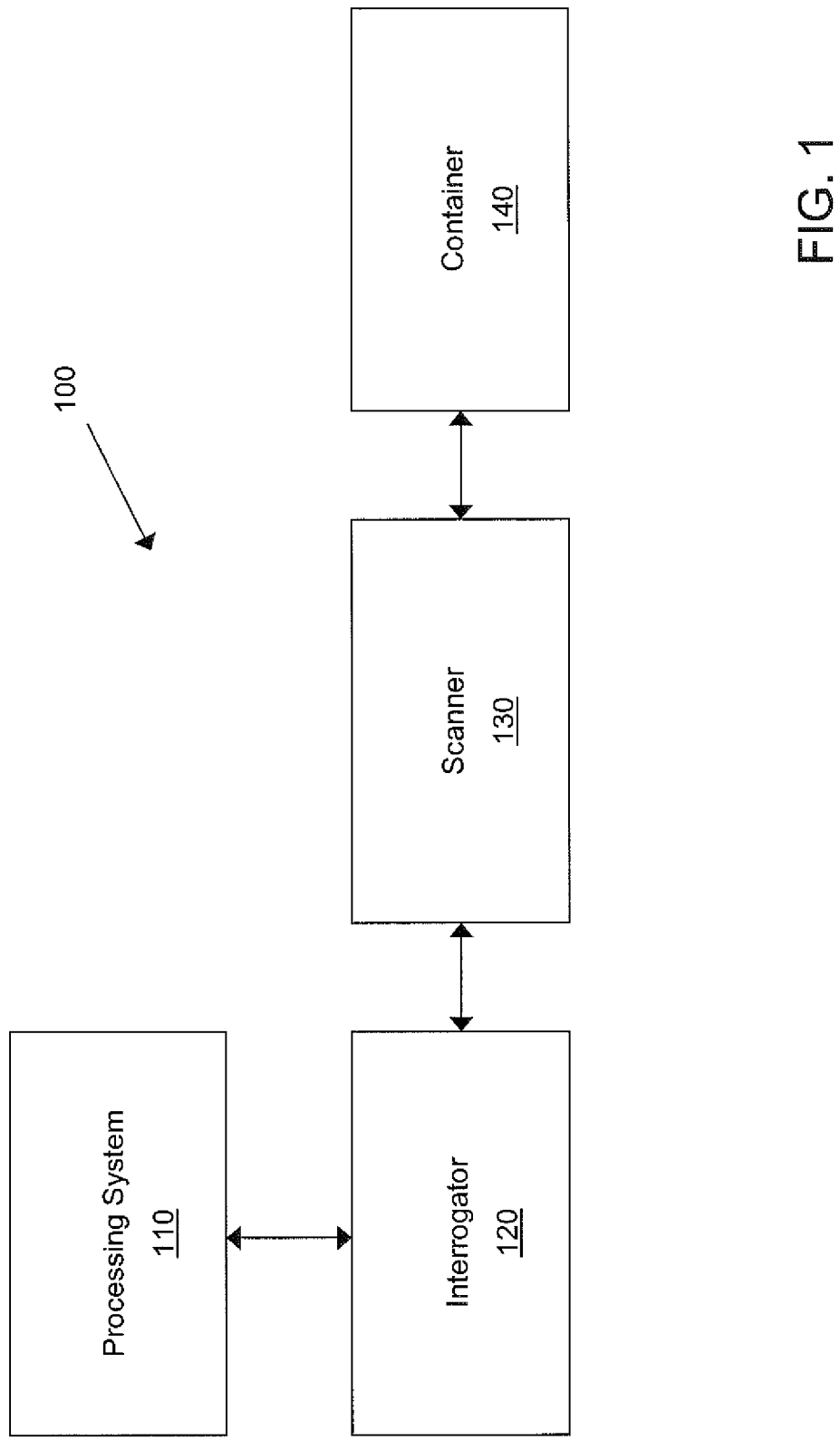
FIG. 1 is a system block diagram of a system for obtaining surveillance information from inside a closed container, whether or not electrically conductive, in accordance with one or more embodiments.

In accordance with one or more embodiments of the present invention, systems and methods provide surveillance information about interior spaces where radar is ordinarily not applicable because the interior space is surrounded by an electrically conductive surface that shields the interior space from the RF radiation used by radar. Such interior spaces include, for example, metal cargo containers such as ship containers and semi-trailers, railroad cars, and aircraft fuselages, whether metal or carbon fiber composite, which also creates an electrical shielding effect. Of course, embodiments may also be used for non-shielded interior spaces as well. Embodiments may be particularly useful for immigration enforcement, for example, in the prevention of smuggling of individuals across international borders. Embodiments may discriminate living individuals from inanimate objects inside, for example, a cluttered shipping container that may contain various types of cargo—such as a lumber payload container—as well as individuals. One or more embodiments may be used to detect motionless live presence inside a container, for example, using radar signatures for heart rate (pulse) or breathing. Embodiments may be useful in situations where direct scanning of the interior space using portable, hand-held radars may not be applicable such as for interior spaces that are electrically shielded from a radar unit at the exterior, such as a metal shipping container, metal semi-trailer rig, railroad car, or other enclosed type of vehicle. Embodiments may be implemented with light-weight, low power, small profile RF imaging systems that are capable of detecting targets underground, through walls, concrete, soil, and gravel. Various embodiments may be ideal for counter-terrorism, traffic monitoring, weapon neutralization, and search and rescue missions.

One or more embodiments may employ narrow and wide beam Ultra Wide Band (UWB) pulses in the license-free 3-8 GHz band with a 5 GHz center frequency, for example. In one or more embodiments, the surveillance system sensing apparatus may include multiple sensors, such as a combination of a 5 Giga Hertz (GHz) ultra-wideband (UWB) radar imaging system, a very high frequency, e.g., 60 GHz ultra-wideband radar imaging system, and RF imaging using 60 GHz radar applying a very narrow RF beam. The radiated power of an RF imager in one embodiment may be less than 100 microwatts (uW). Total mountable remotely monitored sensor weight may be less than 5.0 pounds (lb). A user interface may be provided using user friendly configuration and image construction software, as disclosed by various references incorporated herein by reference.

A number of multi-sensor and compact radar systems are disclosed in co-pending United States patent applications, including: U.S. patent application Ser. No. 12/852,440, filed Aug. 6, 2010; U.S. patent application Ser. No. 12/732,163, filed Mar. 25, 2010; and U.S. patent application Ser. No. 12/649,268, filed Dec. 29, 2009, all of which are herein incorporated by reference. An inductively coupled antenna array is disclosed in U.S. Pat. No. 6,963,307; an integrated antenna module with micro-waveguide is disclosed in U.S. Pat. No. 7,126,542; a wireless remote sensor is disclosed in U.S. Pat. No. 7,358,848; an RFID reader and active tag is disclosed in U.S. Pat. No. 7,432,855; a wireless repeater is disclosed in U.S. Pat. No. 7,697,958; and control of an integrated beam forming array using near-field-coupled or far-field-coupled commands is disclosed in U.S. Pat. No. 7,742,000, all of which are herein incorporated by reference.

FIG. 1 illustrates a system 100, in accordance with one or more embodiments, for obtaining surveillance information from inside a closed container. System 100 may include a processing system 110 for processing radar signals and providing an output display to a user that may interpret the signals and provide imaging on a display screen of what the radar "sees". Examples of such systems may be found in the incorporated references. Processing system 110 may communicate with an interrogator 120, as shown in FIG. 1. If processing system 110 and interrogator 120 form an integral unit, communication may, for example, be by electrical signals sent directly between the two. In an alternative embodiment, processing system 110 may communicate with interrogator 120 via a communications link, such as a Wi-Fi® link or 3G or 4G wireless communication, as shown, for example, in FIG. 2. A communications link may also be provided, for example, using wired USB®, Bluetooth®, or any other suitable communications link.

Interrogator 120 may include circuitry for transmitting and receiving radar signals to scanner 130 as well as circuitry for communicating radar data back to processing system 110. Interrogator 120 may also include a coupler for communicating with scanner 130. The coupler may operate inductively, for example, as a near-field coupler or may operate radiatively as a far-field coupler. Scanner 130 may include an antenna, such as a dipole antenna as shown in the figures, for transmitting and receiving radar signals. Scanner 130 may, for example, include a beam forming array as described in the incorporated references. Scanner 130 may also include a coupler for communicating with interrogator 120, which may be, as just described, either a near-field coupler or far-field coupler. Scanner 130 may be mounted to a container 140 so that the antenna portion of scanner 130 is disposed to scan the interior of container 140. Container 140 may have an electrically conductive surface enclosing the interior space to be scanned so that the interior space could not effectively be scanned from the exterior with an ordinary radar system. Processing system 110, interrogator 120, and scanner 130 thus may form a radar system 100 capable of scanning the interior of a container 140 and detecting and imaging objects of interest inside the container. For example, various radar systems, as described in the incorporated references, may be used to detect the movement or breathing of at least one live object (e.g., a live person) inside the container 140, to identify whether or not there is any activity or no activity occurring within the container 140, to identify precisely the distance of the live object from the scanner, to detect perturbation in time as a movement of objects inside the container 140.

System 100 discloses an innovative two-layer connectivity for the scanner 130 antenna inside the container 140 and inductive (near-field) or radiative (far-field) coupling of the scanner 130 to interrogator 120 electronics outside the container 140. Use of a communication link (e.g., from interrogator 120 to processing system 110) may provide the system of the scanner 130 and interrogator 120 capability for detection of a live person in a cargo container remotely, which can be advantageous for keeping operators and users out of hazardous situations, for example. Scanner 130 (or scanner 130 and interrogator 120 if used integrally) may be sealed to protect the system against harsh environments, e.g., salt spray from the ocean, in the case, for example, of using system 100 for shipping containers.

Figure 2:
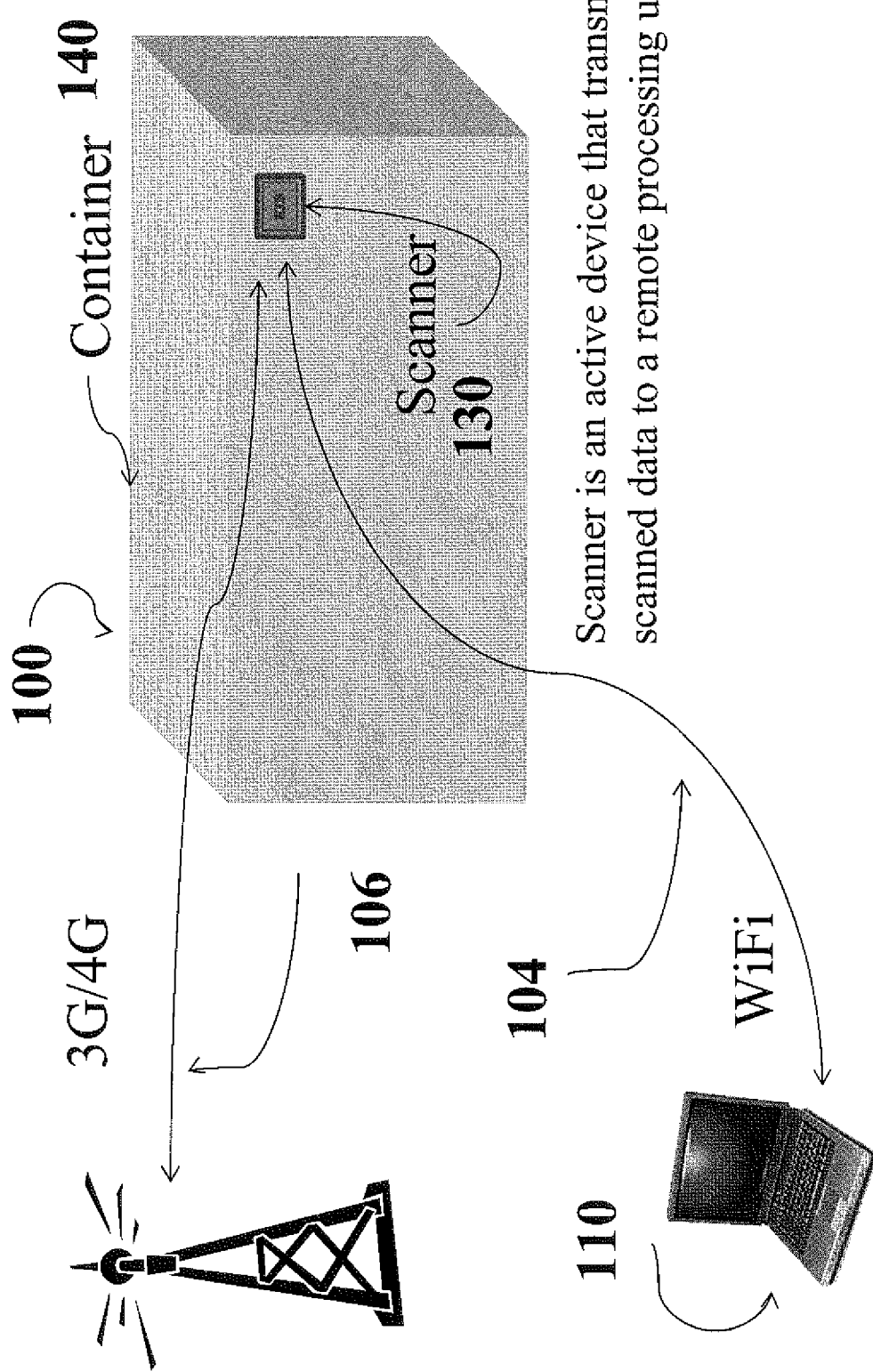
FIG. 2 is a system diagram for a system such as that shown in FIG. 1, in accordance with one embodiment.

FIG. 2 illustrates a system such as that shown in FIG. 1, in accordance with one alternative embodiment, in which the system 100 communicates over a wireless communications link (e.g., a 3G or 4G wireless link 106, or a Wi-Fi® link 104) with processing system 110. In one embodiment, scanner 130 may integrated with interrogator 120 and the integrated interrogator-scanner may include electronics for transmitting and receiving data over the communications link (e.g., link 104, and/or 106). In this embodiment, the scanner-interrogator 130-120 may be viewed as an active device that transmits data to a remote processing unit, e.g., processing system 110.

Figure 3:
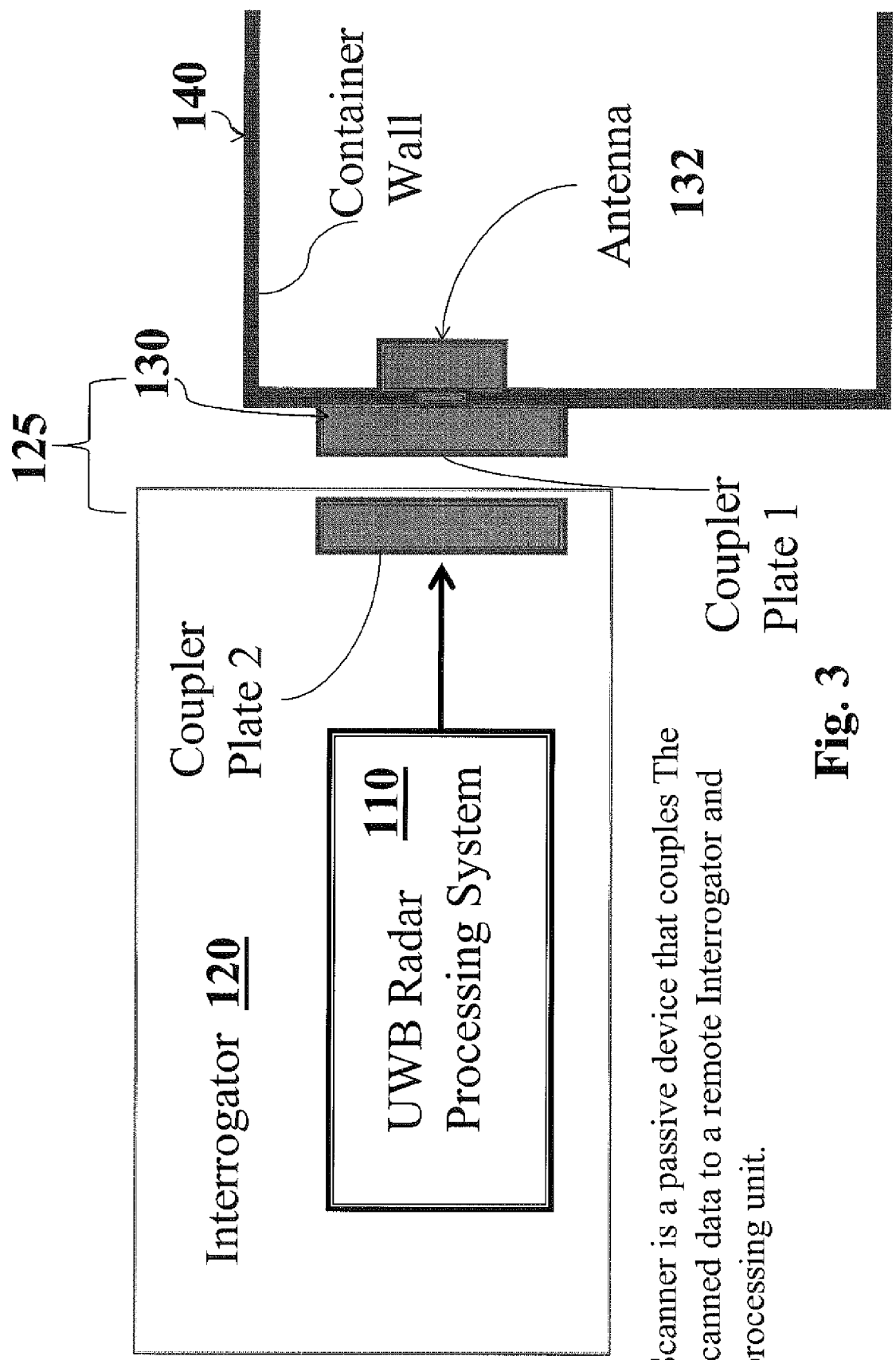
FIG. 3 is a system diagram for a system such as that shown in FIG. 1, in accordance with another embodiment.

FIG. 3 illustrates a system such as that shown in FIG. 1, in accordance with another alternative embodiment, in which the system 100 may integrate processing system 110 with interrogator 120. The integrated processing system-interrogator 110-120 may communicate with scanner 130 using a coupler 125. Coupler 125 may include a first coupler plate (labeled coupler plate 1) and a second coupler plate (labeled coupler plate 2) that may communicate either inductively (near-field) or using electromagnetic radiation (far-field). In this embodiment, the scanner 130 may be viewed as a passive device that couples scanned data (e.g., data gathered from interior of container 140 using radar antenna 132) to a remote interrogator and processing unit, e.g., integrated processing system-interrogator 110-120.

Figure 4:
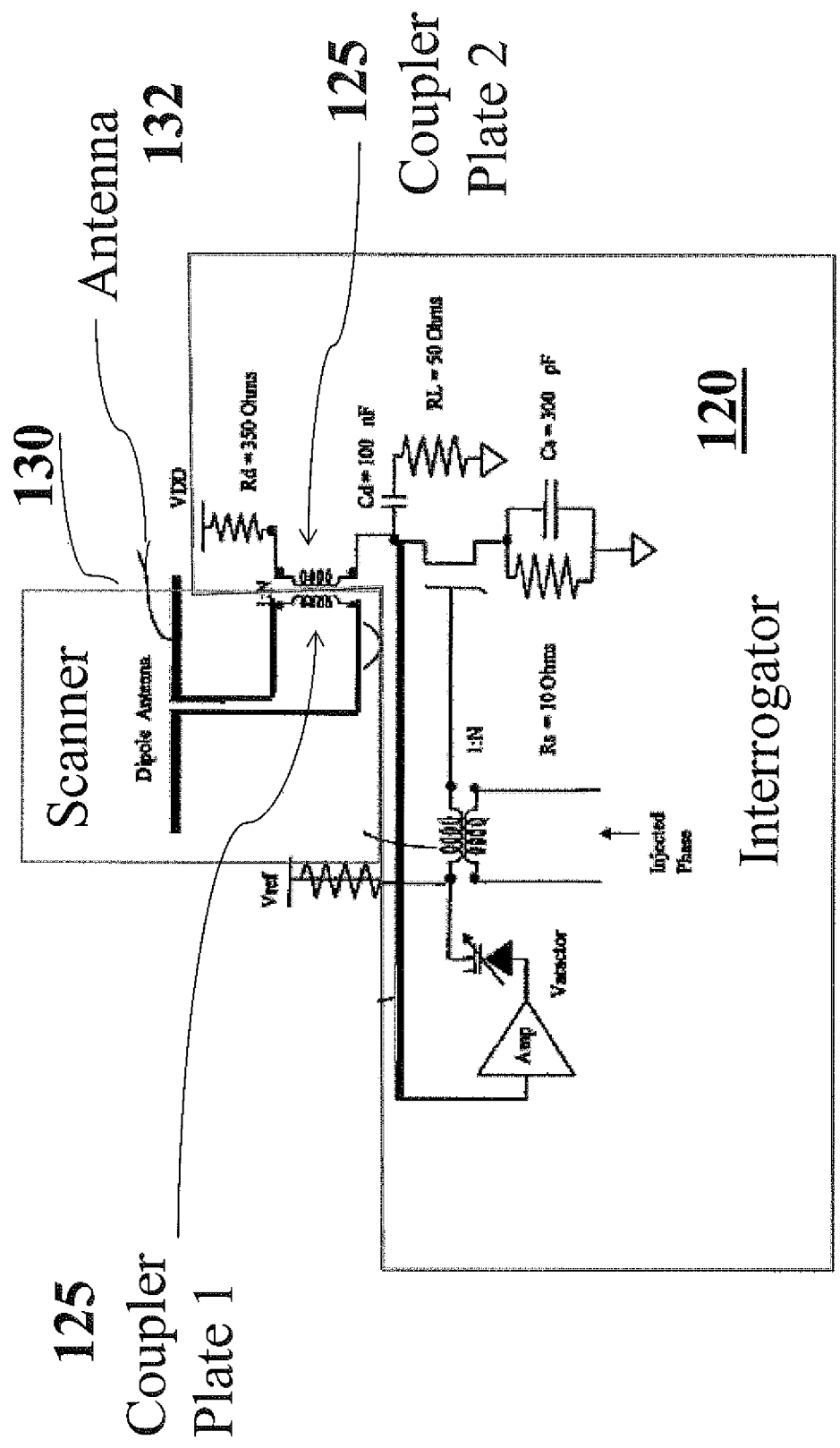
FIG. 4 is a circuit diagram for a portion of a system such as one shown in FIG. 3, in accordance with an embodiment.

FIG. 4 illustrates a circuit for a portion of a system such as one shown in FIG. 3, in accordance with an embodiment. As shown, an inductive (near-field communication) coupler 125 may include coupler plate 1 and coupler plate 2, which may be inductive coils as shown. The circuit shown in FIG. 4 is described in more detail in the incorporated references.

Figure 5A:
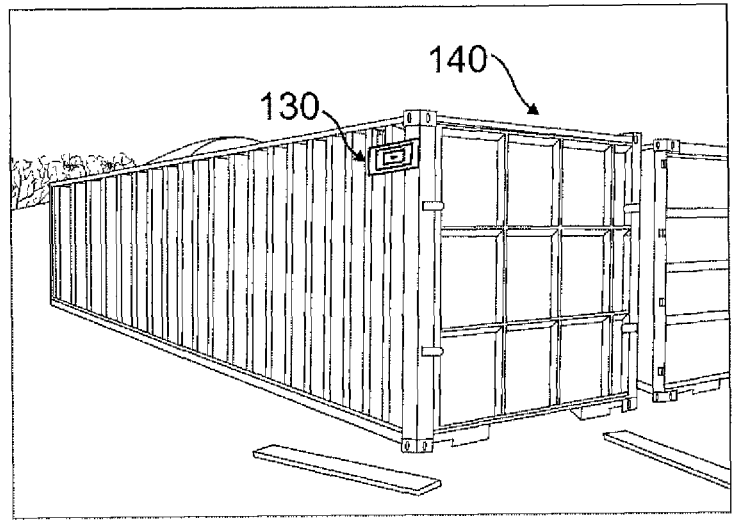
FIG. 5A is a perspective view of a container in accordance with an embodiment.
Figure 5B:
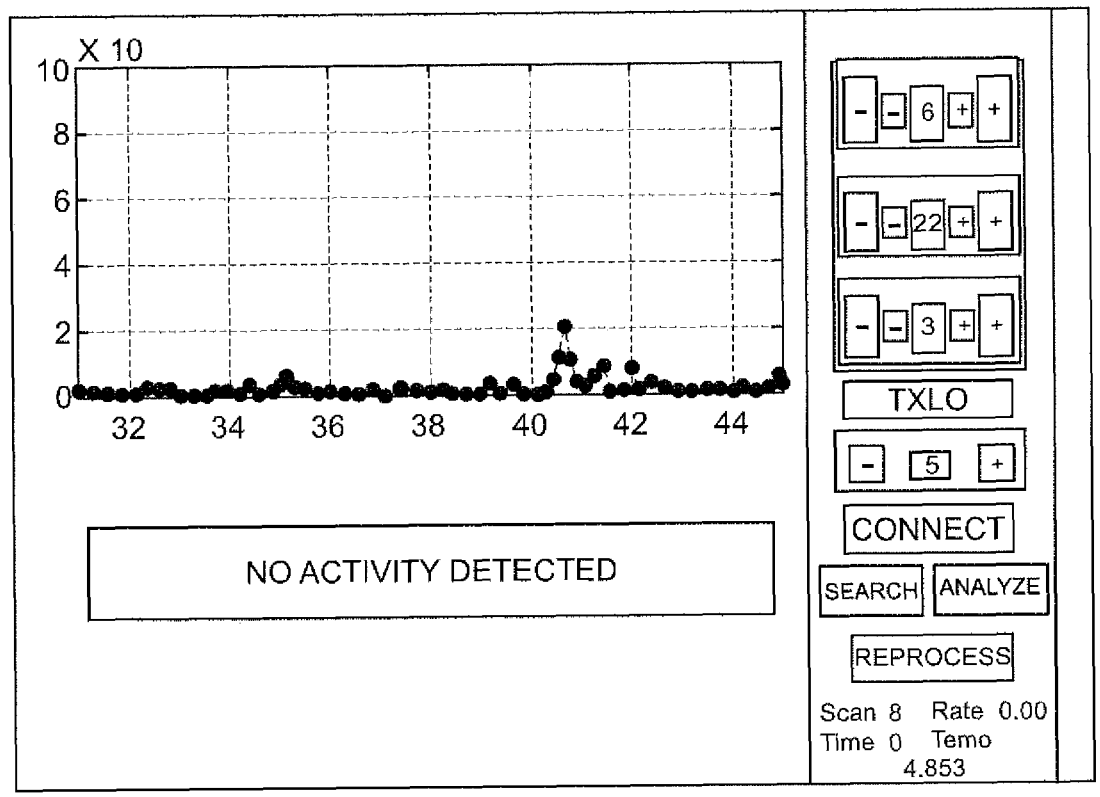
FIGS. 5B, 5C, and 5D show examples of radar signatures for various situations occurring within the container shown in FIG. 5A, for a surveillance system in accordance with an embodiment.
Figure 5C:
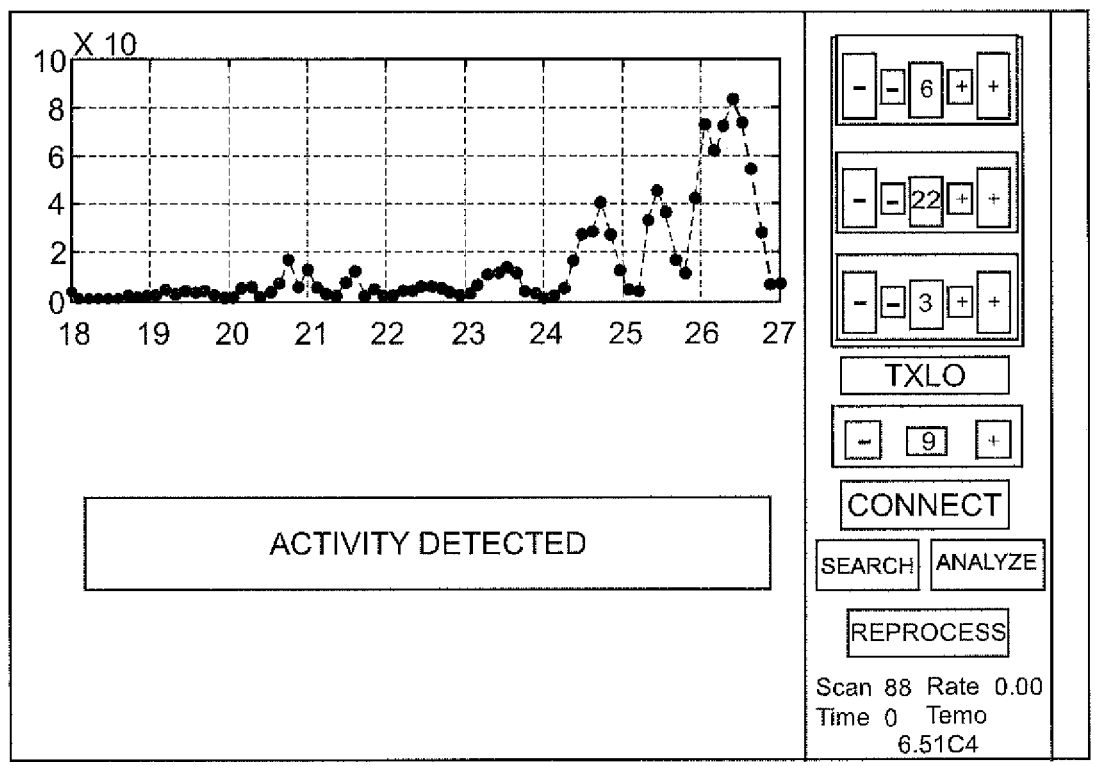
Figure 5D:
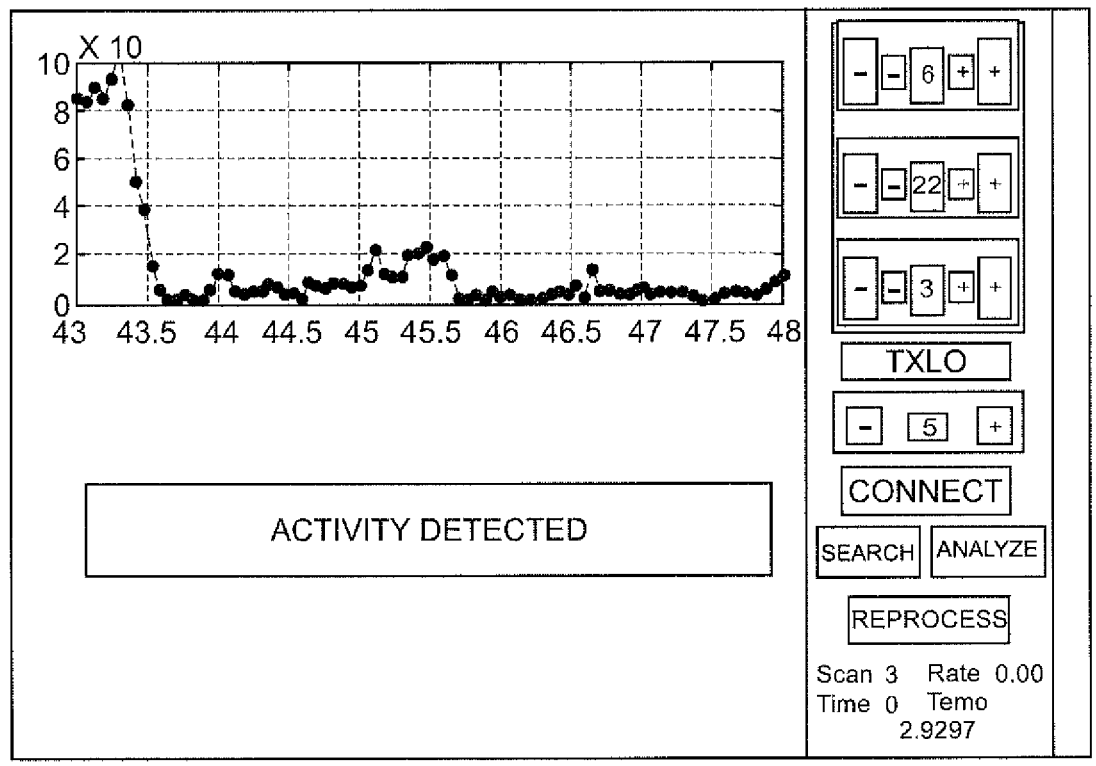

FIG. 5A is a perspective view of a container 140 having mounted on it a system (e.g., labeled as a scanner 130) such as system 100 shown in FIG. 1. FIGS. 5B, 5C, and 5D show examples of radar signatures for various situations occurring within the container 140 shown in FIG. 5A. FIG. 5B shows an example radar signature (signal profile) that may displayed on a user interface display of a processing system 110, for example, for a situation in which no activity has been detected inside container 140. In other words, if the interior of container 140 is scanned and a radar signature such as that shown in FIG. 5B is displayed, the operator or user of system 100 may decide to be satisfied that there is no activity occurring inside container 140. FIG. 5C shows an example radar signature for a situation in which a person has been detected at a distance of 25 feet from the scanner 130 (e.g., from scanning antenna 132 inside the container 140). FIG. 5D shows an example radar signature for a situation in which a person has been detected at a distance of 39 feet from the scanner 130 (e.g., from scanning antenna 132 inside the container 140). Depending on the radar system used, as disclosed by the various incorporated references, for example, processing system may be able to indicate a variety of information about the inside of container 140, such as detecting the movement or breathing of one or more living persons inside the container 140, identifying whether or not there is some activity or no activity occurring within the container 140, identifying the distance of a live person or other animal from the scanner 130, or detecting perturbation in the time domain of the radar signal as a movement of objects inside the container 140.

Figure 6:
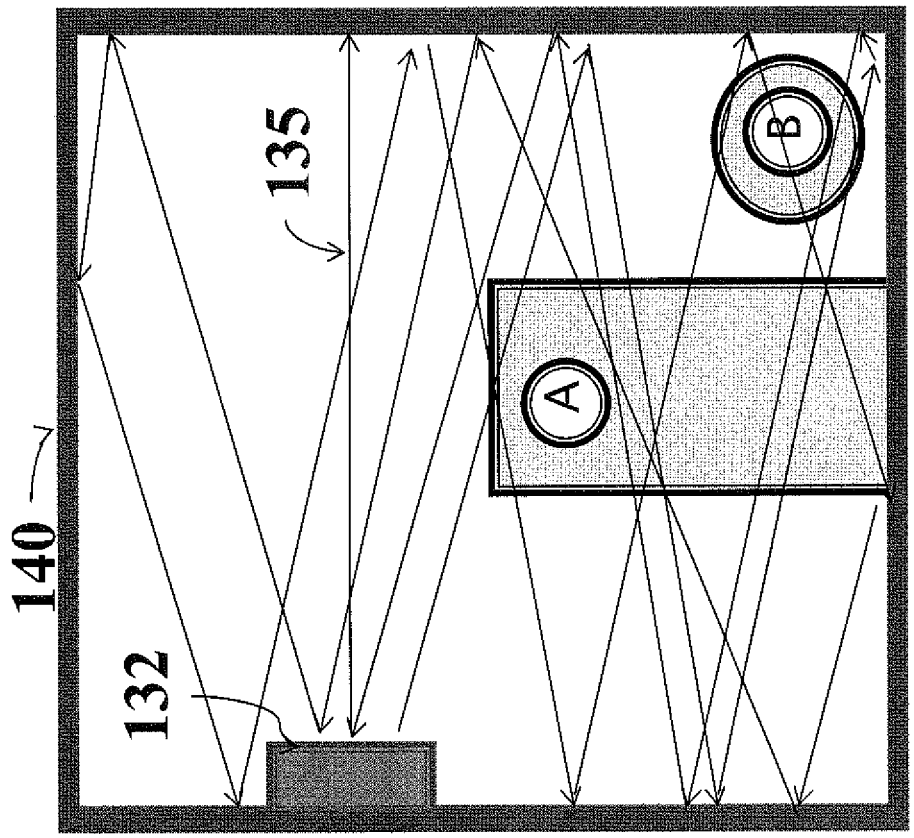
FIG. 6 is a schematic diagram showing an example of radar detection inside a container, in accordance with an embodiment.

FIG. 6 illustrates an example of radar detection inside a container 140 using a system 100 showing two ways the radar can detect movement or breathing of a person or animal (object B) in a non-line of sight situation within a container 140. First method is by multipath 1st, 2nd and 3rd order reflections due to metal (or otherwise conductive) walls of container 140. Multipath reflection may be illustrated in FIG. 6 by signal paths 135, which may represent a single signal pulse radiated from antenna 132 and returning to antenna 132 by the various paths shown. Some of the paths may encounter object B while others do not. Processing system 110 may be able to use the difference in reflected signals to infer information about object B. The second method is penetration capability of broadband radar, for example, through wood, which may be illustrated in FIG. 6 by block A (e.g., lumber cargo), through which some of the signal paths 135 pass directly as shown to encounter object B.

FIG. 7 illustrates an example of radar detection of movement inside a container, in accordance with an embodiment. Object A may move from a first position (1) at a given point in time to a second position (2) at a later point in time. The signal paths 135 will be thus time-variant and processing system 110 may detect the perturbation in time of the reflected radar signal as a movement of object A inside the container 140.

Embodiments described herein illustrate but do not limit the disclosure. It should also be understood that numerous modifications and variations are possible in accordance with the principles of the present disclosure. Accordingly, the scope of the disclosure is best defined only by the following claims.

We claim:

1. A system comprising:
   a radar scanner antenna disposed to scan the interior of a container and operating as a passive device;
   a first coupling plate in communication with the passive radar scanner antenna and affixed to the container so that the passive radar scanner antenna is in communication from the interior of the container to the exterior of the container via the first coupling plate;
   an interrogator having a second coupling plate and circuitry for transmitting and receiving radar signals to the passive radar scanner antenna via the second coupling plate and the first coupling plate and in communication with the passive radar scanner antenna interior to the container from a position exterior to the container via the second coupling plate and the first coupling plate; and
   a processing system in communication with the interrogator, wherein:
   the processing system displays information about the interior of the container.

2. The system of claim 1, wherein:
   the interrogator is near-field coupled to the radar scanner antenna, and
   the interrogator communicates with the processing system via a communications link.

3. The system of claim 1, wherein:
   the interrogator is near-field coupled to the radar scanner antenna, and
   the interrogator is integral with the processing system.

4. The system of claim 1, wherein:
   the interrogator is far-field coupled to the radar scanner antenna, and
   the interrogator is integral with the processing system.

5. The system of clam 1, wherein
   the interrogator is integral with the radar scanner antenna and either near-field coupled or far-field coupled to the radar scanner antenna, and
   the radar scanner antenna communicates with the processing system via a communications link.

6. The system of claim 1, wherein the container has an electrically conductive surface.

7. The system of claim 1, wherein:
   the radar scanner antenna is inductively coupled or radiatively coupled to the interrogator outside the container.

8. The system of claim 1, wherein:
   the radar scanner antenna and interrogator are adapted to provide data by which the processing system can detect heart pulse or breathing of a living organism inside the container.

9. The system of claim 1, wherein:
   the radar scanner antenna and interrogator are adapted to provide data by which the processing system can detect motion of a living organism inside the container.

10. The system of claim 1, wherein:
    the radar scanner antenna and interrogator are adapted to provide data by which the processing system can determine a distance of a living organism from the radar scanner antenna.

11. A method comprising:
    mounting a radar scanner antenna to a container so as to scan the interior of the container, wherein the radar scanner antenna is a passive device;
    connecting a coupler to the radar scanner antenna so that the radar scanner antenna communicates radar signals via the coupler to and from an interrogator at the exterior of the container, wherein the interrogator has circuitry for transmitting and receiving radar signals to the passive radar scanner antenna.

12. The method of claim 11, further comprising:
    communicating data from the radar scanner antenna to an interrogator via the coupler.

13. The method of claim 11, further comprising:
    communicating data from the radar scanner antenna to an interrogator via the coupler, wherein:
    the communication is via a near-field coupling.

14. The method of claim 11, further comprising:
communicating data from the radar scanner antenna to an interrogator via the coupler, wherein:
the communication is via a far-field coupling.

15. The method of claim 11, further comprising:
communicating data from the radar scanner antenna to an interrogator via the coupler; and
processing data from the interrogator so as to provide a radar signature, wherein the radar signature indicates there is a living organism detected in the container or the radar signature indicates there is not a living organism detectable in the container.

16. The method of claim 11, wherein:
the container has a surface that electrically shields the interior of the container from exterior RF radiation.

17. The method of claim 11, further comprising:
communicating data from the radar scanner antenna to an interrogator via the coupler; and
communicating from the interrogator to a processing system via a communications link.

18. A method comprising:
coupling an integral interrogator and radar processing system to a passive radar scanner antenna via a coupler mounted on an exterior of a container and connected to the radar scanner antenna disposed in an interior of the container;
transmitting and receiving, by the interrogator, radar signals between the interrogator exterior to the container and the passive radar scanner antenna interior to the container via the coupler to produce a radar scan data of the interior of the container; and
processing, by the radar processing system, the radar scan data from the interior of the container.

19. A method comprising:
linking a radar processing system via a communications link to an interrogator that is coupled to a passive radar scanner antenna via a coupler that is mounted on an exterior of a container and connected to the radar scanner antenna disposed in an interior of the container;
transmitting and receiving, by the interrogator, radar signals between the interrogator exterior to the container and the passive radar scanner antenna interior to the container via the coupler to produce a radar scan data of the interior of the container; and
processing, by the radar processing system, the radar scan data from the interior of the container.

* * * * *